United States Patent [19]

Bosik

[11] 4,234,762
[45] Nov. 18, 1980

[54] RING TRIP DETECTOR CIRCUIT

[75] Inventor: Barry S. Bosik, Parsippany, N.J.

[73] Assignee: Bell Telephone Laboratories, Incorporated, Murray Hill, N.J.

[21] Appl. No.: 974,387

[22] Filed: Dec. 29, 1978

[51] Int. Cl.³ .............................................. H04M 3/04
[52] U.S. Cl. ............................... 179/18 HB; 179/84 R
[58] Field of Search ............ 179/18 F, 18 FA, 18 HB, 179/84 R, 84 A; 307/133, 135; 200/144

[56] References Cited

U.S. PATENT DOCUMENTS

| | | | |
|---|---|---|---|
| 3,720,793 | 3/1973 | Hofmann | 179/18 HB |
| 4,071,709 | 1/1978 | Lee et al. | 179/18 HB |
| 4,126,765 | 11/1978 | Calder et al. | 179/18 AH |

Primary Examiner—Thomas A. Robinson
Attorney, Agent, or Firm—Robert O. Nimtz

[57] ABSTRACT

A ring trip detection circuit is disclosed for a remotely generated ringing signal in a subscriber loop carrier system. The ring trip detection circuit is enabled only during the high voltage half-cycle of the ringing signal to increase ring trip detection sensitivity and reduce the size and complexity of the ring trip detection circuit.

6 Claims, 2 Drawing Figures

RING TRIP DETECTOR CIRCUIT

BACKGROUND OF THE INVENTION

1. Field of the Invention

This invention relates to telephone supervisory control circuits and, more particularly, to ring trip control circuits.

2. Description of the Prior Art

It has become increasingly common to utilize carrier-derived subscriber channels on a single pair of metallic telephone wires to postpone, or obviate the necessity for, the installation of expensive telephone cable. One such carrier system is disclosed in the copending application of the present applicant, Ser. No. 974,384, filed of even date herewith.

One of the problems associated with such carrier systems is that direct current and low frequency signals can no longer be used for supervisory signaling on the metallic loop. It is therefore necessary to provide an alternative method of supervisory signaling for each of the carrier-derived channels in such a system.

In order to provide ringing signals in a carrier system such as that described above, it is often necessary to generate the ringing signals locally at the remote and of the carrier system and to control the application of such ringing signals to the telephone subscriber's station set by supervisory signals transmitted on the carriers themselves. In the aforementioned copending application of the present applicant, such ringing is provided by gating a high voltage source onto the local subscriber's drop wires at a ringing signal rate, e.g., 20 Hz.

In such a system, as in all other application of ringing signals, it is necessary to detect when the subscriber goes off-hook (i.e., removes his handset from the telephone base) so as to terminate the ringing signals. This function, called "ring trip," is normally provided by relays at the central office which respond to the talking current which begins to flow in the subscriber loop in response to the off-hook condition. In a carrier-derived channel, such ring trip detection is no longer possible and means must be provided to accomplish this function at the remote end of the carrier facility.

It is also necessary to provide ring trip detection separately for each of the carrier-derived channels supported by the single transmission facility. Since these circuits must be located at the remote end of the carrier facility, it is essential that they consume little power and be small in size.

SUMMARY OF THE INVENTION

In accordance with the illustrative embodiment of the present invention, ring trip detection is accomplished by a very simple voltage detection circuit. The sensitivity of this circuit is greatly enhanced by operating the voltage detection circuit only during the high voltage half of the ringing cycle. During this half of the 20 Hz ringing cycle, a considerably larger voltage is applied to the subscriber drop than is present at any other time. When the subscriber goes off-hook, a low impedance is placed across tip and ring conductors of the subscriber drop. In order to prevent large currents from flowing due to the high ringing voltage appearing across this low impedance, current limiting is included in the ringing generator which does not allow ringing currents to exceed that which is required to ring the subscriber telephone sets.

The voltage, then, appearing on the subscriber drop when the high voltage half of the ringing cycle is applied to an off-hook phone is created by the current limited current flowing through the low subscriber set impedance. The voltage thus developed is much lower than the normal line voltage appearing at this time. Hence, the ring trip condition can be detected using a simple voltage detection circuit which responds to the presence of a low voltage during what is normally the high voltage cycle of ringing.

Theoretically, such a ring trip detection could be performed instantaneously. However, in a practical implementation, some delay must be included in order to avoid ring tripping during the turn-on and turn-off transients of the ringing generator as well as due to spurious transients appearing on the subscriber drop.

A major advantage of ring trip detection in accordance with the present invention is the rapidity with which such detection takes place, normally permitting the termination of the ringing signal during a single half-cycle of the ringing signal. The subscriber will therefore not be inconvenienced by continued ringing after going off-hook. Moreover, this arrangement minimizes the use of ringing power, thereby conserving such power in the remotely located ringing generator and allowing the use of inexpensive, low-power semiconductor components in the ringing generator.

DETAILED DESCRIPTION

Figure 1:
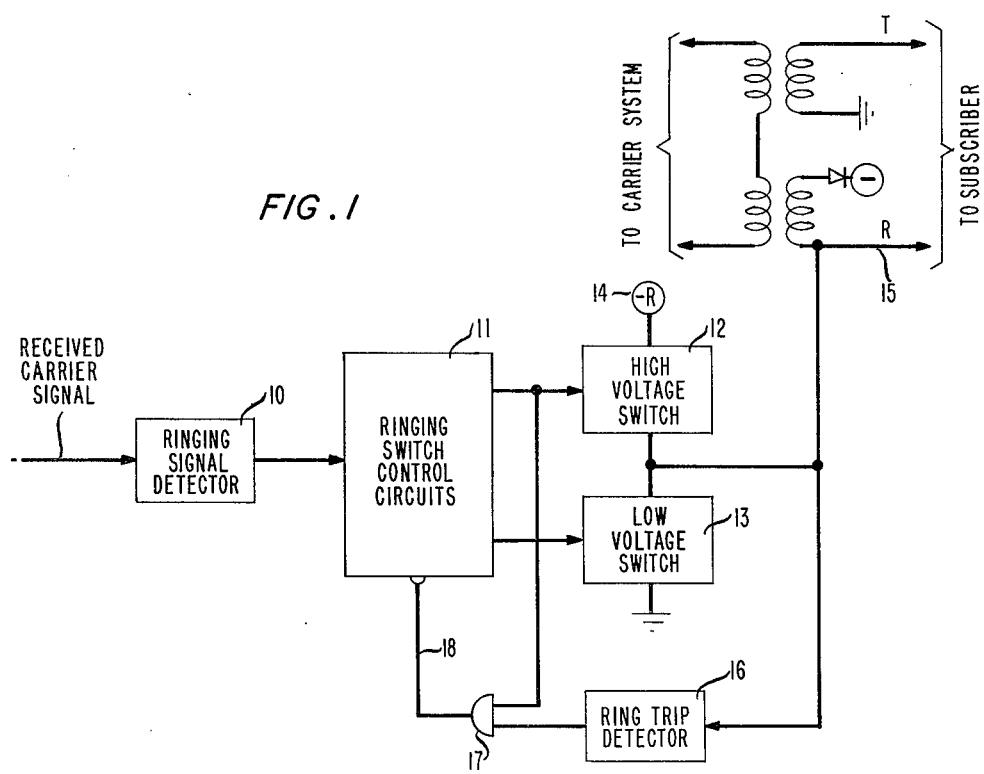
FIG. 1 is a general block diagram of a telephone ringing signal trip detector in accordance with the present invention.

In FIG. 1 there is shown a general block diagram of a portion of the remote terminal of a subscriber loop carrier system utilizing the ring trip arrangements of the present invention. The circuits of FIG. 1, duplicated for each subscriber, comprise a ringing signal detector 10 which, as is described in detail in the aforementioned application of the present applicant, detects ringing supervisory tones modulated on the carrier signal for the particular subscriber. These ringing supervisory signals are used to control a ringing switch control circuit 11 which, in response thereto, operates a high voltage gate 12 and a low voltage gate 13 in alternation. High voltage switch 12 connects a high voltage ringing source 14 to the ring conductor 15 of the local subscriber drop for one-half of the ringing cycle. Low voltage switch 13 connects ring conductor 15 to ground potential for the remaining half of the ringing cycle, thus providing a return path for ringing currents on the subscriber loop.

Ring trip detector circuit 16 includes circuitry for detecting the low voltage condition on ring conductor 15 when the attached subscriber goes off-hook and thereby causes a voltage drop on the loop. The output of ring trip detector 16 is connected to one input of AND gate 17. The other input to AND gate 17 is supplied from the input of high voltage switch 12. Thus a ring trip detection signal is transmitted back to the control circuits 11 only if the low voltage condition appears during the high voltage cycle. When the off-hook condition is detected, ring trip detector 16 produces a signal through AND gate 17 on lead 8 which is used to disable ringing switch control circuit 11 and thus terminate the ringing signals.

It can be seen that ring trip detection in the arrangement of FIG. 1 takes place only during the high voltage half of the ringing cycle. This greatly increases the sensitivity of the ring trip detection and permits fast-acting ring trip operation. This is in contrast to prior art ring trip detection where subscriber loop off-hook currents had to be averaged over a longer period of time to insure accurate detection.

Figure 2:
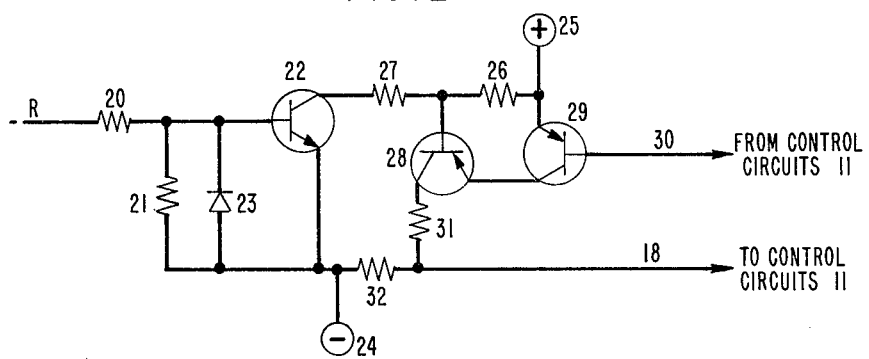
FIG. 2 is a more detailed circuit diagram of a portion of the ringing trip detector shown in block form in FIG. 1.

In FIG. 2 there is shown a detailed circuit diagram of the ring trip detector 16 of FIG. 1. In FIG. 2 it can be seen that the voltage on ring lead 15 is connected across a voltage divider including resistors 20 and 21, the midpoint of which is connected to the base of transistor 22. A diode 23 is connected between the base and emitter electrodes of transistor 22 to protect these electrodes from reverse voltages on line 15. The emitter of transistor 22 is connected to negative biasing source 24.

When enabled by a sufficiently low (negative) voltage on ring conductor 15 transistor 22 turns on, providing a current path from positive voltage source 25 through a voltage divider including resistors 26 and 27. The midpoint of resistors 26 and 27 is connected to the base of transistor 28 and would normally be of a sufficient value to turn transistor 28 on. A second transistor 29, however, has its collector-emitter path connected in series with the base-emitter path of transistor 28. Thus, transistor 28 cannot be turned on until transistor 29 is turned on by a signal to its base electrode on lead 30, thereby supplying operating voltage from source 25 to the emitter of transistor 28.

When both transistors 28 and 29 are enabled by signals on their base electrodes, a current is delivered through the voltage divider comprising resistors 31 and 32. Thus, the midpoint of resistors 31 and 32 supplies a voltage on lead 18 which can be used, as shown in FIG. 1, to disable the ringing switch control circuits 11 and thereby terminate ringing signals. The signal on lead 30 to the base of transistor 29 is supplied from the control signals at the input of high voltage ringing switch 12 in FIG. 1. Thus, transistors 28 and 29 comprise the AND gate 17 of FIG. 1 and insure the detection of ring trip only during the high voltage half of the ringing cycle.

Although the present invention has been described in connection with a particular subscriber loop carrier system, it is clear that the principles of this invention can be readily applied to any situation where ring trip detection is required and where the ringing signal has a partial-cycle which is significantly higher in voltage than the other partial-cycle. These voltage constraints are common in most ringing signal sources, not only in remotely derived ringing signals for carrier systems, but also in many central office ringing signal generators.

I claim:

1. A ring trip detection circuit for subscriber loop carrier systems wherein the ringing signal source provides one half-cycle of the ringing signal which is of a substantially higher voltage than the other half-cycle, said detection circuit characterized by a voltage detector for detecting an off-hook condition in a telephone subscriber station set, and means for enabling said voltage detector only during said half-cycle having said substantially higher voltage.

2. The ring trip detection circuit according to claim 1 further characterized in that said voltage detector comprises a voltage divider, a midpoint of which is connected to operate a transistor gate.

3. The ring trip detection circuit according to claim 2 further characterized by unilateral conducting means connected from said midpoint to one end of said voltage divider.

4. The ring trip detection circuit according to claim 1 further characterized in that said enabling means comprises a transistor switch having its collector-emitter path connected in series with the output of said detector.

5. A voltage detection circuit for intermittently applied voltages characterized by means for detecting said voltages, and means for enabling said voltage detection means only during those periods in which a nonzero portion of said intermittent voltage is being applied.

6. The voltage detection circuit according to claim 5 characterized in that said intermittent voltage appears across a telephone set connected in the telephone loop when the telephone subscriber goes off-hook, and said intermittently applied voltage comprises a ringing signal for operating a telephone ringer in said set.

* * * * *